US012769129B2

(12) United States Patent
Adema et al.

(10) Patent No.: US 12,769,129 B2
(45) Date of Patent: Oct. 20, 2026

(54) WAFER LEVEL OPTICS FOR VIRTUAL REALITY CAMERAS

(71) Applicant: Google LLC, Mountain View, CA (US)

(72) Inventors: Daniel Adema, Kitchener (CA); Shreyas Potnis, Kitchener (CA)

(73) Assignee: Google LLC, Mountain View, CA (US)

( * ) Notice: Subject to any disclaimer, the term of this patent is extended or adjusted under 35 U.S.C. 154(b) by 260 days.

(21) Appl. No.: 18/620,454

(22) Filed: Mar. 28, 2024

(65) Prior Publication Data

US 2024/0329405 A1 Oct. 3, 2024

Related U.S. Application Data

(60) Provisional application No. 63/492,915, filed on Mar. 29, 2023.

(51) Int. Cl.
*G02B 27/01* (2006.01)
*G02B 13/00* (2006.01)

(52) U.S. Cl.
CPC ..... *G02B 27/0172* (2013.01); *G02B 13/0085* (2013.01); *G02B 2027/0138* (2013.01); *G02B 2027/0178* (2013.01)

(58) Field of Classification Search
CPC ............ G02B 13/0085; G02B 27/0093; G02B 27/0172; G02B 27/017; G02B 2027/0138; G02B 2027/0178; G06K 9/00664; G06K 9/00671; G06T 2215/16; G06T 19/006; G06F 3/011–015; H04N 2201/3245; A61B 2019/5291; A61B 2090/365; A63F 2300/8082; G05B 2219/32014; G05B 2219/39449; G05B 2219/39451
See application file for complete search history.

(56) References Cited

U.S. PATENT DOCUMENTS

2017/0285308 A1* 10/2017 Georgiev ................ B32B 37/12
2021/0011289 A1* 1/2021 Fortin-Deschênes ........................ G02B 27/017
2023/0036762 A1* 2/2023 Hong ................... H04N 13/167
2023/0393399 A1* 12/2023 Odom ................ G02B 27/0172
2023/0393401 A1* 12/2023 Schowengerdt ... G02B 27/0172

* cited by examiner

*Primary Examiner* — Ephrem Z Mebrahtu
(74) *Attorney, Agent, or Firm* — Brake Hughes Bellermann LLP

(57) ABSTRACT

Various configurations of projectors and cameras are disclosed that use shared wafer level optics, in which optical elements, e.g., microlenses, of a projector are fabricated on the same wafer as optical elements, e.g., microlenses, of a camera. Projectors and cameras can be mounted together on a mixed reality headset, e.g., an AR/VR headset, for example, as a feature of smart glasses. Some projectors and/or cameras can be co-located in the arm or temple of the glasses. Some projectors and/or cameras can be co-located near a center point of the frame of the glasses. Use of shared wafer-level optics provides a compact and efficient solution for simultaneously guiding light leaving a projector and light entering a camera.

13 Claims, 7 Drawing Sheets

WAFER LEVEL OPTICS FOR VIRTUAL REALITY CAMERAS

CROSS-REFERENCE TO RELATED APPLICATION

This application claims priority to U.S. Provisional Patent Application No. 63/492,915 filed on Mar. 29, 2023, titled "Common Substrate Wafer Level Optics for Augmented and Virtual Reality Cameras and Projectors," the disclosure of which is incorporated by reference herein in its entirety.

FIELD OF THE DISCLOSURE

The present disclosure relates to camera and projection features of an augmented reality (AR) or virtual reality (VR) headset.

BACKGROUND

Virtual reality (VR) provides an immersive experience for the user that is an alternative to the real-world environment. Augmented reality (AR) technology overlays digital content onto a real-world environment to provide an immersive experience for a user. AR/VR headsets can be in the form of, for example, goggles or "smart" glasses that are electronically enhanced. For example, cameras, inertial measurement units (IMUs), and audio devices can be disposed on the headset. The cameras can project images onto a lens of the headset, providing a heads-up display (HUD). Another function of an AR/VR headset is gaze tracking, or eye tracking (ET), in which sensors are used to follow the direction of the user's vision.

SUMMARY

The present disclosure describes various configurations of projectors and cameras that use shared wafer level optics, in which optical elements, e.g., microlenses, of a projector are fabricated on the same wafer as optical elements, e.g., microlenses, of a camera. Projectors and cameras can be mounted together on a mixed reality headset, e.g., an AR/VR headset, for example, as a feature of smart glasses. Some projectors and/or cameras can be co located in the arm or temple of the glasses. Some projectors and/or cameras can be co-located near a center point of the frame of the glasses.

In some aspects, the techniques described herein relate to eyewear, including: a frame; a lens; a camera disposed in the frame, the camera including a first optical element fabricated on a transparent wafer; and a projector disposed in the frame, adjacent to the camera, the projector including a second optical element fabricated on a same transparent wafer as the first optical element.

In some aspects, the techniques described herein relate to eyewear, wherein the first optical element includes a first microlens formed on a front side of the transparent wafer and a second microlens formed on a back side of the transparent wafer.

In some aspects, the techniques described herein relate to eyewear, wherein the second optical element includes a first microlens formed on a front side of the transparent wafer and a second microlens formed on a back side of the transparent wafer.

In some aspects, the techniques described herein relate to eyewear, wherein the projector further includes a transparent waveguide that extends into the lens of the eyewear.

In some aspects, the techniques described herein relate to eyewear, wherein light emitted from the projector passes through the transparent waveguide.

In some aspects, the techniques described herein relate to eyewear, wherein light incident on the camera passes through the transparent waveguide.

In some aspects, the techniques described herein relate to eyewear, wherein the camera further includes an optical element formed on a different transparent wafer.

In some aspects, the techniques described herein relate to eyewear, wherein the projector further includes an optical element formed on a different transparent wafer.

In some aspects, the techniques described herein relate to eyewear, wherein the projector emits light in a same direction as the camera receives light.

In some aspects, the techniques described herein relate to eyewear, wherein the projector includes a micro-LED panel.

In some aspects, the techniques described herein relate to eyewear, wherein the camera further includes a third optical element, and the projector further includes a fourth optical element, wherein the third optical element and the fourth optical element are fabricated on a same transparent wafer.

In some aspects, the techniques described herein relate to eyewear, wherein the camera is a first camera, and further including a second camera including a third optical element fabricated on the same transparent wafer.

In some aspects, the techniques described herein relate to eyewear, wherein the projector is a first projector, and further including a second projector including a fourth optical element fabricated on the same transparent wafer.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The components in the drawings are not necessarily drawn to scale relative to each other. Like reference numerals designate corresponding parts throughout the several views.

DETAILED DESCRIPTION

Figure 1:
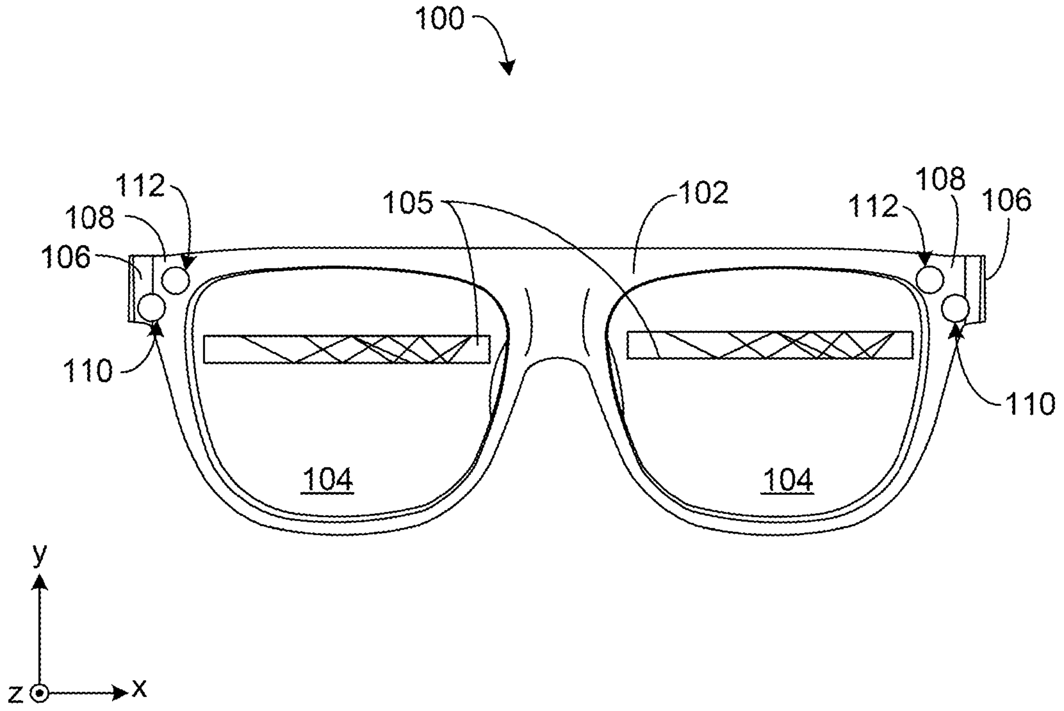
FIG. 1 is a pictorial view of augmented reality (AR) glasses, according to a possible implementation of the present disclosure.

Some cameras mounted to AR/VR headsets are world-facing cameras that track the wearer's field of view, so that the camera sees what the wearer sees. Some cameras mounted to AR/VR headsets are rear-facing cameras used for gaze tracking. A gaze tracker used in a computing device, e.g., a mixed reality headset such as a head mounted device, or augmented reality (AR) glasses, is an eye tracking device that transmits a light beam toward the user's eye, and monitors light reflected and/or scattered from the eye. Such eye tracking devices can be mounted in the frame of, for example, AR glasses.

Projectors mounted to AR/VR headsets are used to display information and images on lenses of the headset for viewing by the wearer, similar to a heads-up display in a vehicle. Some projectors can be programmed to overlay information onto images. Projectors used in AR glasses can be programmed to overlay both information and images onto a real world scene of the wearer's surroundings.

At least one technical problem with mounting projectors and cameras to the frames of AR glasses is that the frame is very narrow and will not accommodate many devices. That is, real estate on the glasses frame can be expensive, from a design standpoint.

At least one technical solution to address this concern is to consolidate optical elements, e.g., lenses, used in the projector(s) and camera(s). The optical elements used in tiny devices that fit on an eyeglass frame can be fabricated as microlenses on a transparent, e.g., see-through, wafer substrate, in a process similar to a microelectronics process used to fabricate computer chips. Since the projectors and cameras can be co-located next to one another on the frame of the AR glasses, it makes sense to fabricate the microlenses, or wafer-level optics, on a common e.g., same, or shared, substrate. With the benefit of shared wafer-level optics, an optics module bearing the various lenses can be inserted into a path of light entering the camera and leaving the projector.

Another element in the light path of the projector and/or the camera on a pair of AR glasses can be a transparent, e.g., see-through, waveguide. The transparent waveguide can be configured to capture light transmitted from an optical transceiver located in the arm of the AR glasses. A waveguide is a structure that spatially confines a light beam to propagate within a particular material, preventing light energy from escaping the material. The waveguide can then channel the light beam in a particular direction. The transparent waveguide described herein is integral to the lens of the glasses so that the transparent waveguide is invisible to the wearer and therefore does not obstruct the wearer's vision. The transparent waveguide can include transparent optical elements, e.g., lenses. Specifically, the transparent waveguide can direct light captured at the edge of the lens toward the center of the lens, e.g., towards a center or other designated location of the lens, in front of, e.g., directly in front of, the eye.

FIG. 1 is a pictorial view of a pair of immersive glasses 100, according to some implementations of the present disclosure. The immersive glasses 100 are eyewear, suitable for use as, for example, augmented reality (AR) glasses that superimpose information through a display within the immersive glasses 100 onto a real-world scene, or virtual reality (VR) goggles, e.g., a virtual reality headset, that immerse the wearer in a virtual world. AR/VR headsets, e.g., mixed reality headsets, can be contrasted with ambient glasses, e.g., prescription eyeglasses with corrective lenses, which are configured to enhance visual perception of a user in the real world. Some implementations that include VR goggles can be configured, e.g., made large enough, to fit over a pair of glasses, e.g., prescription glasses, ambient glasses. AR glasses can be a lighter weight and/or less bulky option than VR goggles. The immersive glasses 100, when implemented as AR glasses or ambient glasses, can incorporate prescription lenses that are tailored to the wearer's vision so that they function as enhanced ambient glasses.

The immersive glasses 100 include a frame 102, lenses 104, e.g., eyeglass lenses (two shown) that each may include a transparent waveguide 105 (one shown), arms 106 (two shown), and temples 108 (two shown). In some implementations, the frame 102 includes the arms 106 and the temples 108, as well as a lens-supporting portion, e.g., a front portion of the frame 102. The front portion is attached to the arms 106 and extends in a plane, e.g., the x-y plane, substantially transverse to the arm(s) 106 which extend out from the frame 102 in the −z direction. As in the case of regular, or ambient glasses, the arms 106 hold the immersive glasses 100 in place on the wearer's head. However, in some implementations, the arms 106 and/or the temples 108 can also serve as a platform for various sensors and input/output (I/O) devices that provide information flow to and from the immersive glasses 100. For example, headsets and other wearable computing devices such as the immersive glasses 100 may include various types of electronic components for computation, imaging, and both long-range and short-range radio frequency (RF) wireless communication. Such electronic devices can include, for example, a camera 110 and a projector 112. In some implementations, the camera 110 can be a world-facing camera that receives reflected light rays that propagate toward the wearer in the −z direction. I some implementations, the camera 110 can be an eye-tracking camera that receives reflected light rays that propagate away from the wearer's eye, in the +z direction.

In FIG. 1, a camera 110 and a projector 112 can be co-located, e.g., located next to one another, in each one of the temples 108, or at a junction, where the temple 108 meets the arm 106. Consequently, in some implementations, the immersive glasses 100 can support two cameras 110, and two projectors 112, one for each lens 104. The projectors 112 emit light for display on the lenses 104, while the cameras 110 receive reflected light. In some implementations, one or more of the cameras 110 is a world-facing camera that receives reflected light from objects in the wearer's field of view. Placing a world-facing camera 110 on the frame 102 of the immersive glasses 100 at the temples 108 can track the field of view of each eye, e.g., from two different vantage points. In some implementations, one or more of the cameras 110 can be a rear-facing camera that receives reflected light from the wearer's face, e.g., an eye-tracking camera that receives reflected light from the wearer's eye. Both the camera 110 and the projector 112 thus involve the use of optics, e.g., internal optical elements, or arrangements of microlenses, for directing, e.g., guiding, light rays toward the camera(s) 110 and away from the projector(s) 112.

Additional features can be mounted on, or attached to, the immersive glasses 100, including, for example, an input device, an RF wireless transceiver, e.g., a transmitter/receiver such as a Bluetooth communication transceiver, light emitting diodes (LEDs), sensors, e.g., IMUs, audio devices e.g., microphones, speakers, and so on. In some implementations, the arms 106 and/or the temples 108 can include eye tracking components such as a light source, e.g., an illuminator and a light sensor/receiver, e.g., an eye-tracking camera. The illuminator can be disposed in the frame 102, e.g., in the temple 108 of the frame 102, or in the arm 106 of the frame 102. The illuminator can be configured to transmit an incident light beam in the direction of the adjacent lens 104. In some implementations, the illuminator can be a transceiver, that is, a transmitter (source) and a receiver (detector) that are co-located in the arm 106. In some implementations, there may be a one-to-one correspondence between pixels, or picture elements, of the detector and rays in the incident light beam.

The lens 104 and the transparent waveguide 105 can be made of a transparent material or materials, e.g., glass or one or more polymer materials, that transmit light toward the user's eye. Optical elements within the lens 104 can receive an incident light beam that propagates in a direction substantially normal (perpendicular) to the surface of the lens 104 and to the surface of the wearer's eye. The lens 104 can then redirect incident light rays through, e.g., along a length of, the transparent waveguide 105, by total internal reflection (TIR). In some implementations, boundaries of the transparent waveguide 105 can be delineated by variation in the index of refraction within the material of the lens 104. The light rays can then be directed out of the transparent waveguide 105 so that a light beam emerges from the lens 104. When the lens 104 is substantially aligned with the x-y plane, the propagation direction of light is along the z-axis as shown in FIG. 1. Sensors and I/O devices can be positioned on an arm 106 of the glasses or at the temples 108, or along a rim of the frame 102, around the lenses 104.

Figure 2:
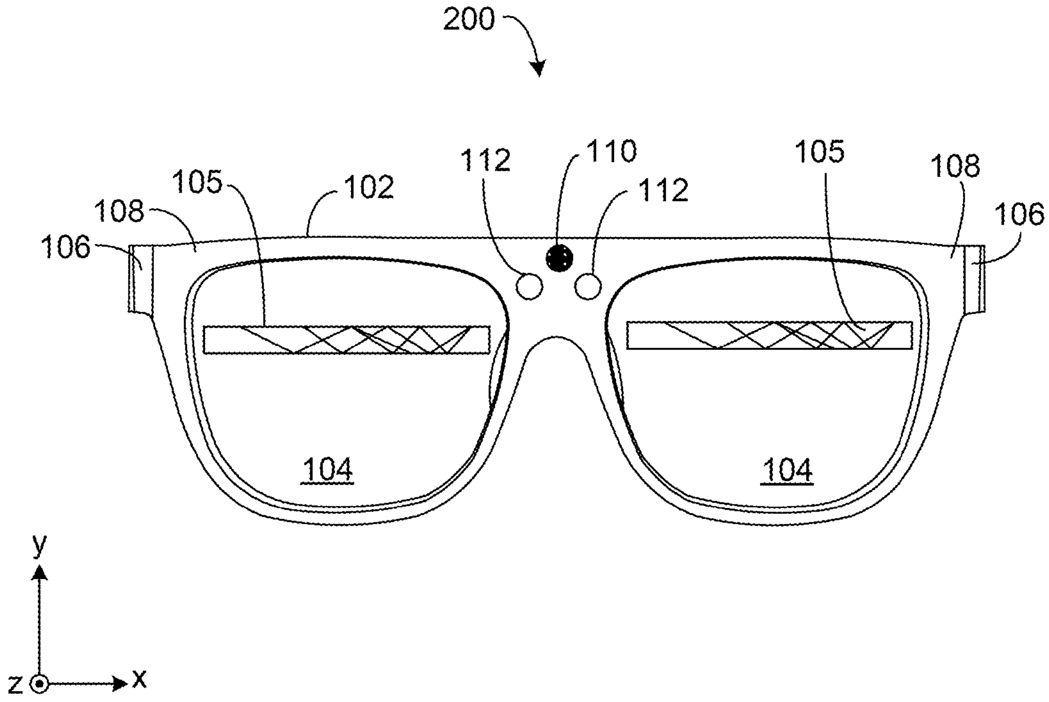
FIG. 2 is a pictorial view of augmented reality (AR) glasses, according to a possible implementation of the present disclosure.

FIG. 2 is a pictorial view of a pair of immersive glasses 200, according to some implementations of the present disclosure. In some implementations, the immersive glasses 200 are similar to the immersive glasses 100, except that the camera(s) 110 and the projector(s) 112 are co-located in the center of the frame 102, instead of at the temples 108. Consequently, the immersive glasses 200 can provide two projectors 112, one for each lens 104, alongside a single camera 110. In some implementations, the immersive glasses 200 can include two projectors 112 and two cameras 110. In some implementations, one or more of the cameras 110 can be a world-facing camera that tracks the wearer's field-of-view from one or more vantage points. In some implementations, one or more of the cameras 110 can be a rear-facing camera, e.g., an eye-tracking camera that can be used to track the wearer's gaze.

Figure 3:
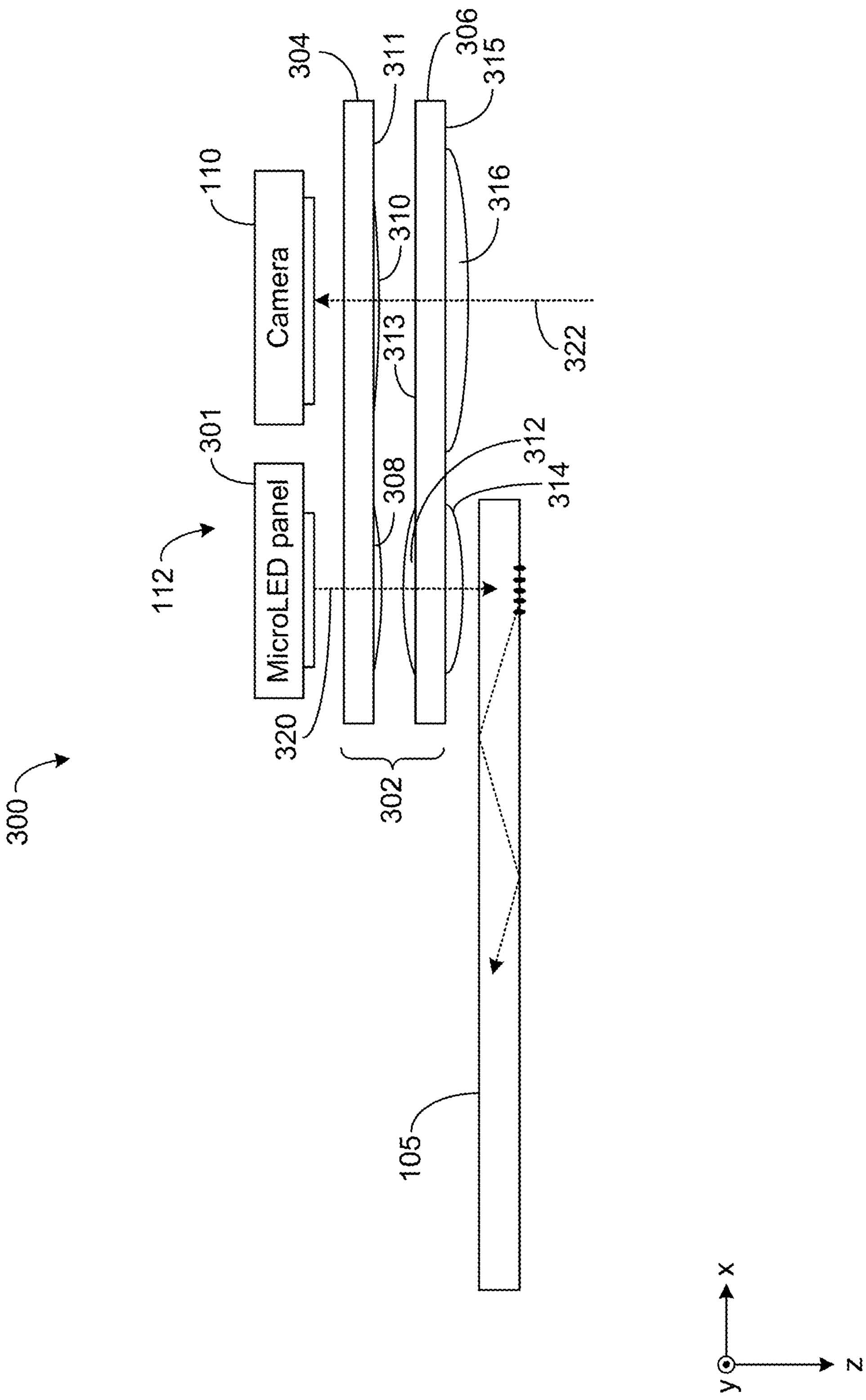
FIGS. 3-7 are top plan views illustrating different configurations of projectors and cameras that feature shared wafer-level optics, according to possible implementations of the present disclosure.

FIG. 3 is a top-down view illustrating an apparatus 300 that features shared wafer-level optics, according to some implementations of the present disclosure. The apparatus 300 can be used, for example, at each of the temples 108 of the immersive glasses 100. In some implementations, the projector 112 can be implemented as a micro-LED panel 301. In some implementations, an optics module 302 can be inserted between the micro-LED panel 301 and the transparent waveguide 105. The optics module 302 can simultaneously be placed in front of the camera 110, e.g., a world-facing camera.

The optics module 302 can include, for example, a pair of transparent wafers on which various optical elements are formed as described below. The optics module 302 can include transparent materials having suitable optical properties, which may include materials such as silicon, sapphire, glass, or a transparent plastic material, e.g., acrylic (polymethylmethacrylate), butyrate (cellulose acetate butyrate), Lexan (polycarbonate), and so on.

In some implementations, the optics module 302 can include a first transparent wafer 304 and a second transparent wafer 306. The first transparent wafer 304 can include a first microlens 308 disposed in front of the micro-LED panel 301 and a second microlens 310 disposed in front of the camera 110, e.g., a world-facing camera. The first microlens 308 and the second microlens 310 can be formed on a same surface of the first transparent wafer 304, e.g., a front-facing surface 311, which faces the +z direction. The second transparent wafer 306 can include a first microlens 312 and a second microlens 314 disposed in front of the micro-LED panel 301 and a third microlens 316 disposed in front of the world-facing camera 110. The first microlens 312 can be formed on a rear-facing surface 313 of the second transparent wafer 306. The second microlens 314 and the third microlens 316 can be formed on a same surface of the second transparent wafer 306, e.g., a front-facing surface 315, facing the +z direction.

Using the apparatus 300, a light ray 320 emitted by the micro-LED panel 301 can pass through the first microlens 308 formed on the first transparent wafer 304 followed by the first microlens 312 formed on the second transparent wafer 306, and then the second microlens 314 formed on the second transparent wafer 306, before entering the transparent waveguide 105. The path of the light ray 320 through the optics module 302 therefore passes through a total of three microlenses. Meanwhile, a light ray 322 can pass through the third microlens 316 formed on the second transparent wafer 306, and then the second microlens 310 formed on the first transparent wafer 304, before entering the world-facing camera 110. The path of the light ray 322 through the optics module 302 therefore passes through a total of two microlenses. Use of shared wafer-level optics formed on the optics module 302 thus provides a compact and efficient solution for simultaneously guiding light leaving the micro-LED panel 301 and light entering the world-facing camera 110.

Figure 4:
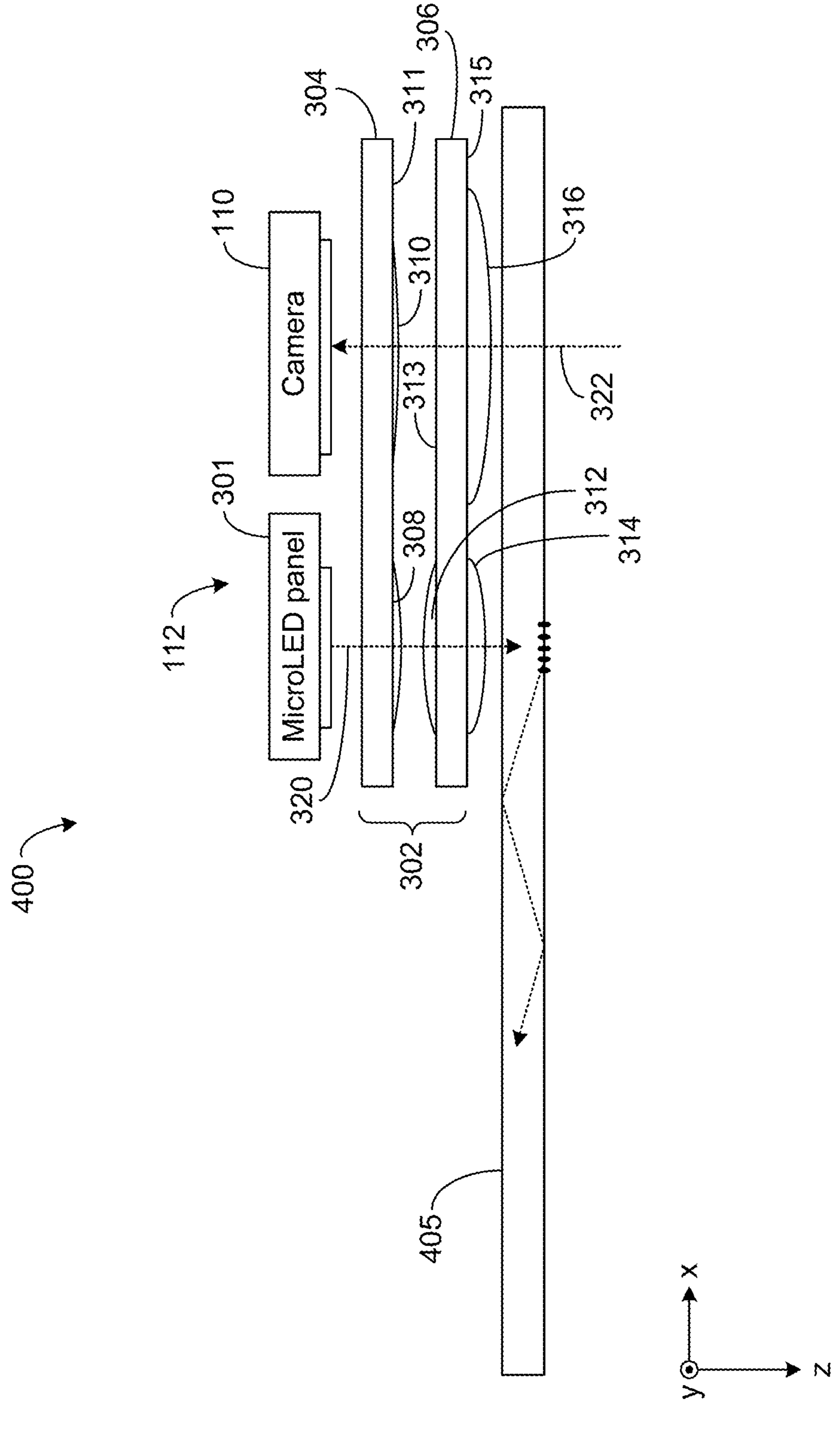

FIG. 4 is a top-down view illustrating an apparatus 400 that features shared wafer-level optics, according to some implementations of the present disclosure. The apparatus 400 can be used, for example, at each of the temples 108 of the immersive glasses 100. In some implementations, the projector 112 can be implemented as the micro-LED panel 301. In some implementations, the optics module 302 can be inserted between the micro-LED panel 301 and an extended transparent waveguide 405, and between the world-facing camera 110 and the extended transparent waveguide 405. The extended transparent waveguide 405 thus extends across the entire length of the optics module 302, covering both the micro-LED panel 301 and the world-facing camera 110.

In some implementations, the configuration of the optics module 302 in the apparatus 400 is the same as in the apparatus 300.

Using the apparatus 400, the light ray 320 emitted by the micro-LED panel 301 in the projector 112 can pass through the first microlens 308 formed on the first transparent wafer 304, followed by the first microlens 312 formed on the second transparent wafer 306, and then the second microlens 314 formed on the second transparent wafer 306, before entering the extended transparent waveguide 405. The path of the light ray 320 through the apparatus 400 is therefore similar to the path of the light ray 320 through the apparatus 300.

Meanwhile, the light ray 322 can pass through the extended transparent waveguide 405, prior to passing through the third microlens 316 formed on the second transparent wafer 306, and then the second microlens 310 formed on the first transparent wafer 304, before entering the world-facing camera 110. The path of the light ray 320 through the apparatus 400 is therefore different from the path of the light ray 320 through the apparatus 300 because of the positioning of the extended transparent waveguide 405 in front of the world-facing camera 110. Again, use of shared wafer-level optics formed in the optics module 302 provides a compact and efficient solution for simultaneously guiding light leaving the micro-LED panel 301 and light entering the world-facing camera 110.

Figure 5:
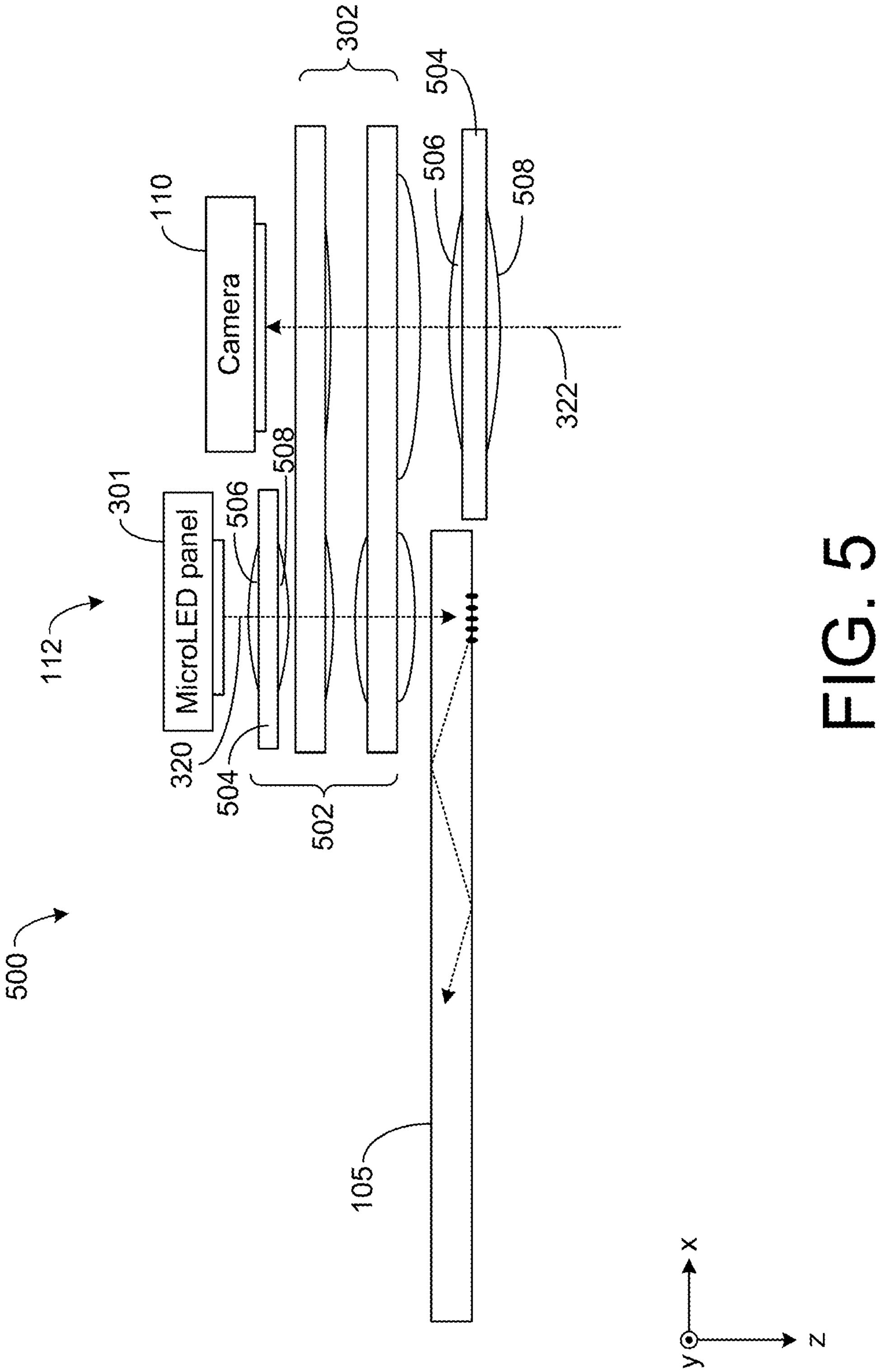

FIG. 5 is a top-down view illustrating an apparatus 500 that features shared wafer-level optics, according to some implementations of the present disclosure. The apparatus 500 can be used, for example, at each of the temples 108 of the immersive glasses 100. In some implementations, the projector 112 can be implemented as the micro-LED panel 301. In some implementations, an optics module 502 can be inserted between the micro-LED panel 301 and the transparent waveguide 105. The optics module 502 can include three transparent wafers, e.g., the optics module 302 that includes two transparent wafers 304 and 306, and an additional transparent wafer 504 disposed behind the optics module 302. The optics module 502 extends between the world-facing camera 110 and another additional transparent wafer 504 disposed in front of the optics module 302. In the apparatus 500, the transparent waveguide 105 only covers the micro-LED panel 301, and does not cover the world-facing camera 110.

In some implementations, the configuration of the optics module 302 in the apparatus 500 is the same as in the apparatus 400 and the apparatus 300.

In some implementations, each one of the additional transparent wafers 504 can include a first microlens 506 formed on a rear-facing surface of the additional transparent wafer 504 and a second microlens 508 formed on a front-facing surface of the additional transparent wafer 504.

Using the apparatus 500, the light ray 320 emitted by the micro-LED panel 301 in the projector 112 can pass through the first microlens 506 formed on the additional transparent wafer 504, followed by the second microlens 508 formed on the additional transparent wafer 504, and then through three microlenses formed on the optics module 302, before entering the transparent waveguide 105. The path of the light ray 320 through the apparatus 500 therefore passes through a total of five microlenses.

Meanwhile, the light ray 322 can pass through the additional transparent wafer 504, prior to passing through two microlenses formed on the optics module 302, before entering the world-facing camera 110. The path of the light ray 320 through the apparatus 500 is therefore different from the path of the light ray 320 through the apparatus 300 and the path of the light ray 322 through the apparatus 400. The path of the light ray 322 through the apparatus 500 therefore passes through a total of four microlenses. Again, use of shared wafer-level optics formed in the optics module 502 and the additional transparent wafers 504 provides a compact and efficient solution for simultaneously guiding light leaving the micro-LED panel 301 and light entering the world-facing camera 110.

Figure 6:
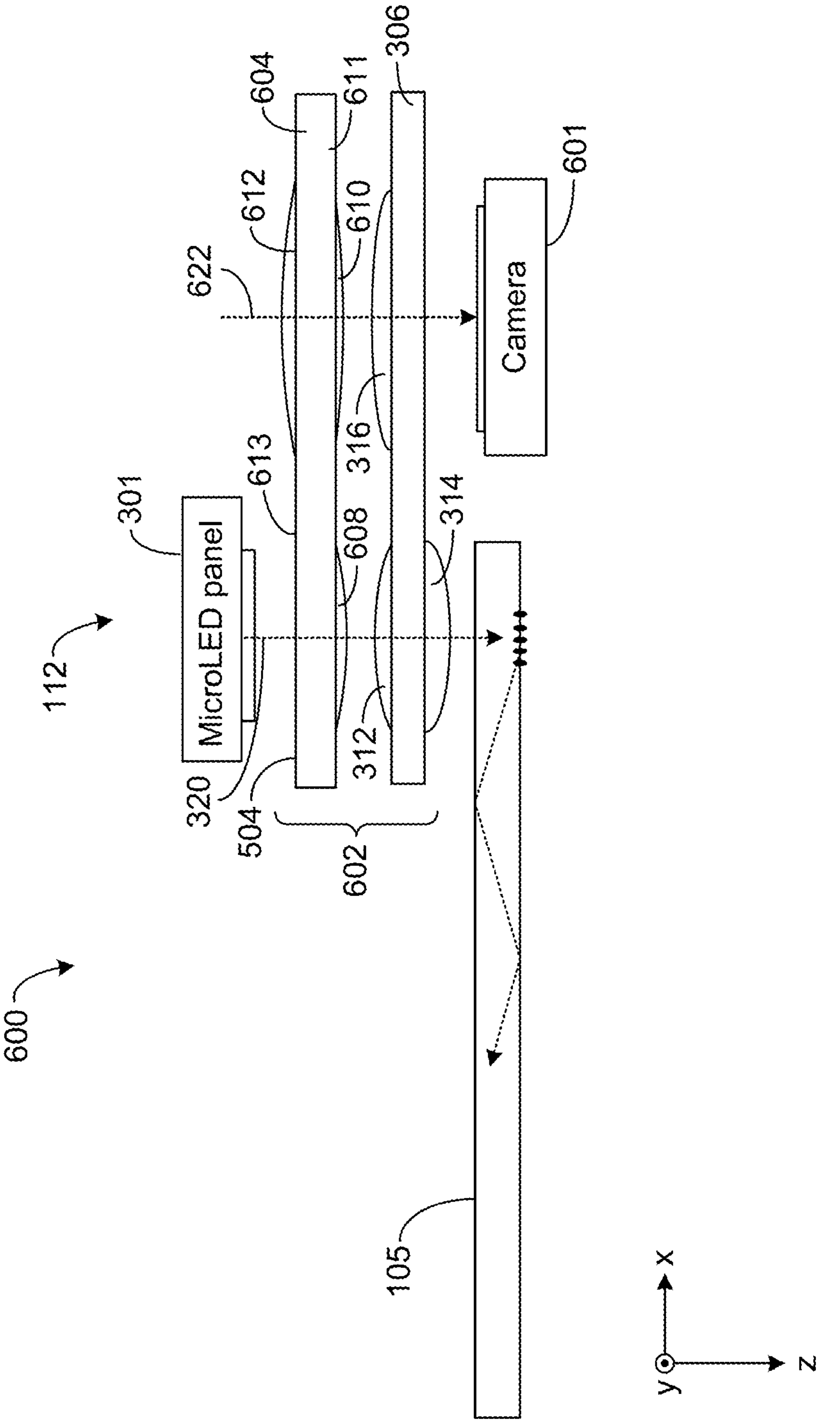

FIG. 6 is a top-down view illustrating an apparatus 600 that features shared wafer-level optics, according to some implementations of the present disclosure. The apparatus 600 can be used, for example, at each of the temples 108 of the immersive glasses 100. In some implementations, the projector 112 can be implemented as the micro-LED panel 301. In some implementations, an optics module 602 can be inserted between the micro-LED panel 301 and the transparent waveguide 105, and behind a camera 601. The camera 601 can be, for example, an eye-tracking camera that monitors eye motion of the wearer. The camera 601 is therefore placed in front of the optics module 602 to receive a light ray 622 that originates at the wearer's face. The camera 601 is disposed on an opposite side of the optics module 602 than the micro-LED panel 301, so that when the micro-LED panel 301 is front-facing, the camera 601 is a rear-facing camera.

The optics module 602 can include, for example, a pair of transparent wafers on which various optical elements are formed as described below. The optics module 602 can include transparent materials having suitable optical properties, which may include materials such as silicon, sapphire, glass, or a transparent plastic material, e.g., acrylic (polymethylmethacrylate), butyrate (cellulose acetate butyrate), Lexan (polycarbonate), and so on. In some implementations, the configuration of the optics module 602 in the apparatus 600 is different from the configuration of the optics module 302 used in the apparatus 300.

In some implementations, the optics module 602 can include a first transparent wafer 604 together with the second transparent wafer 306, as configured in the apparatus 300. The first transparent wafer 604 can include a first microlens 608 disposed in front of the micro-LED panel 301. The first transparent wafer 604 can further include a second microlens 610 and a third microlens 612 disposed behind the rear-facing camera 601.

In some implementations, the first microlens 608 and the second microlens 610 can be formed on a same surface of the first transparent wafer 604, e.g., a front-facing surface 611, which faces the +z direction. The third microlens 612 of the first transparent wafer 604 can be formed on a rear-facing surface 613 of the first transparent wafer 604.

Using the apparatus 600, the light ray 320 emitted by the micro-LED panel 301 in the projector 112 can pass through the first microlens 608 formed on the first transparent wafer 604, followed by the first microlens 312 formed on the second transparent wafer 306, and then the second microlens 314 formed on the second transparent wafer 306, before entering the transparent waveguide 105. The path of the light ray 320 through three microlenses of the apparatus 600 is therefore similar to the path of the light ray 320 through the apparatus 300.

Meanwhile, the light ray 622 reflected from the wearer's face can pass through the third microlens 612 formed on the first transparent wafer 604, followed by the second microlens 610 formed on the first transparent wafer 604, and then the third microlens 316 formed on the second transparent wafer 306, before entering the rear-facing camera 601. The path of the light ray 622 through the apparatus 600 is therefore different from the path of the light ray 322 through the apparatus 300 because of the position of the rear-facing camera 601 being in front of the optics module 602. The path of the light ray 622 through the optics module 602 passes through a total of three microlenses. Again, use of shared wafer-level optics formed on the optics module 602 provides a compact and efficient solution for simultaneously guiding light leaving the micro-LED panel 301 and light entering the rear-facing camera 601.

Figure 7:
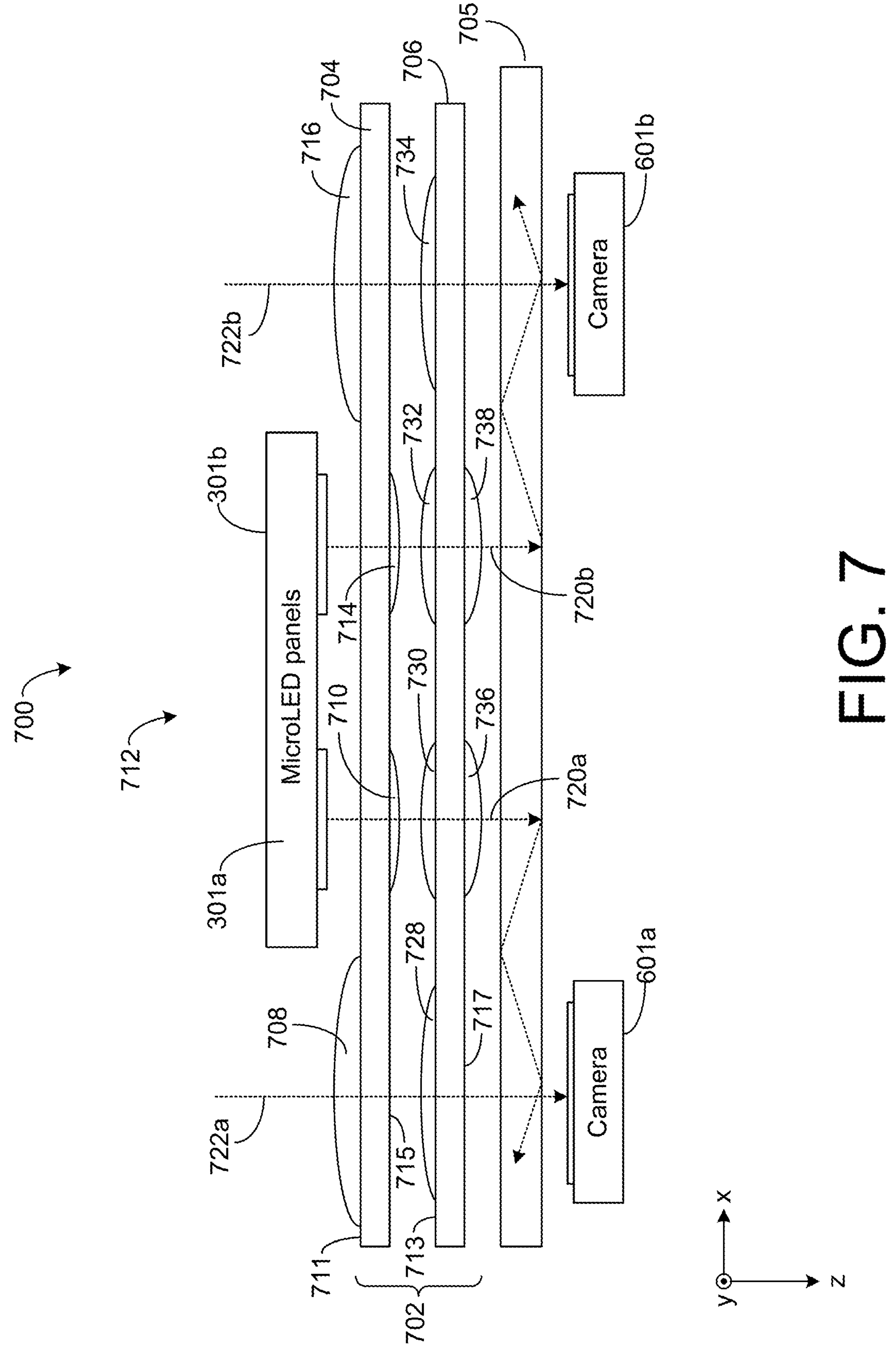

FIG. 7 is a top-down view illustrating an apparatus 700 that features shared wafer-level optics, according to some implementations of the present disclosure. The apparatus 700 can be disposed, for example, at the nosepiece, of the immersive glasses 200, e.g., where the glasses, when being worn, are closest to the bridge of the wearer's nose. The apparatus 700 can include a projector 712 implemented with multiple micro-LED panels 301 (two shown, 301*a* and 301*b*). The apparatus 700 can further be implemented with multiple cameras 601 (two shown, 601*a* and 601*b*) disposed on an opposite side of the optics module 702 than the micro-LED panel 301, e.g., rear-facing cameras 601*a*, 601*b*.

The apparatus 700 can further include an optics module 702 and a transparent waveguide 705. In some implementations, the optics module 702 can include a first transparent wafer 704 and a second transparent wafer 706.

In some implementations, the optics module 702 can be inserted between the micro-LED panels 301*a*, 301*b* and the transparent waveguide 705. The optics module 702 and the transparent waveguide 705 together can be placed between the projector 712 and the rear-facing cameras 601*a* and 601*b*.

The optics module 702 can include, for example, a pair of transparent wafers on which various optical elements are formed as described below. The optics module 702 can include transparent materials having suitable optical properties, which may include materials such as silicon, sapphire, glass, or a transparent plastic material, e.g., acrylic (polymethylmethacrylate), butyrate (cellulose acetate butyrate), Lexan (polycarbonate), and so on.

In some implementations, the first transparent wafer 704 can include a first microlens 708, a second microlens 710, a third microlens 714, and a fourth microlens 716. In some implementations, the first microlens 708 and the fourth microlens 716 can be formed on a same surface of the first transparent wafer 704, e.g., a rear-facing surface 711, facing the −z direction. The second microlens 710 and the third microlens 714 can be formed on a same surface of the first transparent wafer 704, e.g., a front-facing surface 715, facing the +z direction.

In some implementations, the second transparent wafer 706 can include a first microlens 728, a second microlens 730, a third microlens 732, a fourth microlens 734, a fifth microlens 736, and a sixth microlens 738. In some implementations, the first microlens 728, the second microlens 730, the third microlens 732, and the fourth microlens 734 can be formed on a same surface of the first transparent wafer 704, e.g., a rear-facing surface 713, facing the −z direction. The fifth microlens 736 and the sixth microlens 738 can be formed on a same surface of the second transparent wafer 706, e.g., a front-facing surface 717, facing the +z direction.

In some implementations the microlenses 710, 730, and 736 can be disposed in front of the micro-LED panel 301*a*, and the microlenses 714, 732, and 738 can be disposed in front of the micro-LED panel 301*b*. In some implementations the microlenses 708 and 728 can be disposed behind the rear-facing camera 601*a*, and the microlenses 716 and 734 can be disposed behind the rear-facing camera 601*b*.

Using the apparatus 700, a light ray 720*a* emitted by the micro-LED panel 701*a* can pass through the second microlens 710 formed on the first transparent wafer 704 followed by the second microlens 730 formed on the second transparent wafer 706, and then the fifth microlens 736 formed on the second transparent wafer 706, before entering the transparent waveguide 705. The path of the light ray 720*a* through the optics module 702 therefore passes through a total of three lenses. Meanwhile, a light ray 720*b* emitted by the micro-LED panel 701*b* can pass through third microlens 714 formed on the first transparent wafer 704 followed by the third microlens 732 formed on the second transparent wafer 706, and then the sixth microlens 738 formed on the second transparent wafer 706, before entering the transparent waveguide 705. The path of the light ray 720*b* through the optics module 702 therefore passes through a total of three lenses.

A light ray 722*a* can pass through the first microlens 708 formed on the first transparent wafer 704, and then the first microlens 728 formed on the second transparent wafer 706, before entering the transparent waveguide 705 and then the rear-facing camera 601*a*. The path of the light ray 722*a* through the optics module 702 therefore passes through a total of two lenses. Meanwhile, a light ray 722*b* can pass through the fourth microlens 716 formed on the first transparent wafer 704, and then the fourth microlens 734 formed on the second transparent wafer 706, before entering the transparent waveguide 705 and then the rear-facing camera 601*b*. The path of the light ray 722*b* through the optics module 702 therefore passes through a total of two lenses.

Use of shared wafer-level optics formed on the optics module 702 thus provides a compact and efficient solution for simultaneously guiding light leaving the micro-LED panels 301*a* and 301*b*, and guiding light entering the rear-facing cameras 601*a* and 601*b*.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used in this specification, a singular form may, unless definitely indicating a particular case in terms of the context, include a plural form. Spatially relative terms (e.g., "over," "above," "upper," "under," "beneath," "below," "lower," and so forth) may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. In some implementations, the relative terms above and below can, respectively, include vertically above and vertically below. In some implementations, the term "adjacent" can include laterally adjacent to or horizontally adjacent to.

In some implementations of the present disclosure, the terms "about" and "substantially" can indicate a value of a given quantity that varies within 20% of the value (for example, ±1%, ±2%, ±3%, ±4%, ±5%, ±10%, ±20% of the value). These values are merely examples and are not intended to be limiting. The terms "about" and "substantially" can refer to a percentage of the values as interpreted by those skilled in relevant art(s) in light of the teachings herein.

Some implementations may be executed using various semiconductor processing and/or packaging techniques. Some implementations may be executed using various types of semiconductor processing techniques associated with semiconductor substrates including, but not limited to, for example, Silicon (Si), Gallium Arsenide (GaAs), Gallium Nitride (GaN), Silicon Carbide (SiC) and/or so forth.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

It will be understood that, in the foregoing description, when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application, if any, may be amended to recite exemplary relationships described in the specification or shown in the figures.

It is to be appreciated that the Detailed Description section, and not the Abstract section, is intended to be used to interpret the claims. The Abstract section may set forth one or more but not all possible embodiments of the present disclosure as contemplated by the inventor(s), and thus, are not intended to limit the subjoined claims in any way.

What is claimed is:

1. An apparatus, comprising:

a frame;

a camera disposed in the frame, the camera including a first optic fabricated on a wafer; and a projector disposed in the frame, adjacent to the camera, the projector including a second optic fabricated on the wafer, the wafer spanning continuously between the camera and the projector within the frame.

2. The apparatus of claim 1, wherein the first optic includes a first microlens formed on a front-facing surface of the wafer and a second microlens formed on a rear-facing surface of the wafer.

3. The apparatus of claim 1, wherein the second optic includes a first microlens formed on a front-facing surface of the wafer and a second microlens formed on a rear-facing surface of the wafer.

4. The apparatus of claim 1, wherein the apparatus further includes a lens, and wherein the projector further includes a waveguide embedded in the lens.

5. The apparatus of claim 4, wherein light emitted from the projector passes through the waveguide.

6. The apparatus of claim 4, wherein light incident on the camera passes through the waveguide.

7. The apparatus of claim 1, wherein the camera further includes an optical element formed on a different wafer.

8. The apparatus of claim 1, wherein the projector further includes an optic formed on a different wafer.

9. The apparatus of claim 1, wherein the projector emits light in a direction in which the camera receives light.

10. The apparatus of claim 1, wherein the projector includes a micro-light-emitting diode panel.

11. The apparatus of claim 1, wherein the wafer is a first wafer, and wherein the camera further includes a third optic fabricated on a second wafer, and the projector further includes a fourth optic fabricated on the second wafer.

12. The apparatus of claim 1, wherein the camera is a first camera, and wherein the apparatus further comprises a second camera, the second camera including a third optic fabricated on the wafer.

13. The apparatus of claim 1, wherein the projector is a first projector, and wherein the apparatus further comprises a second projector, the second projector including a third optic fabricated on the wafer.

* * * * *